UNITED STATES PATENT OFFICE.

HUGO NOERDLINGER, OF FLÖRSHEIM-ON-THE-MAIN, GERMANY.

PROCESS FOR IMPROVING THE ANTISEPTIC, FUNGICIDAL, AND INSECTICIDAL ACTION OF TAR-OILS.

1,205,924.  Specification of Letters Patent.  Patented Nov. 21, 1916.

No Drawing.   Application filed September 24, 1912.   Serial No. 722,119.

*To all whom it may concern:*

Be it known that I, HUGO NOERDLINGER, a citizen of the German Empire, and residing at Flörsheim-on-the-Main, Germany, have invented a certain new and useful Improved Process for Improving the Antiseptic, Fungicidal, and Insecticidal Action of Tar-Oils, of which the following is a specification.

The subject-matter of my invention is a process for improving the antiseptic, fungicidal and insecticidal action of tar-oils. The employment of tar-oils as an antiseptic, fungicidal and insecticidal agent is well-known, the oils obtained from both coal-tar and wood-tar having been extensively employed. Particularly, large quantities of tar-oils have been used as so-called carbolineum for preserving wood. For this purpose very nearly all the fractions of the crude fraction of tar-distillation known as heavy oils are employed.

Generally speaking, there is a wide-spread view that for the preservation of timber only those tar-oils are of value which contain a certain quantity of the phenols naturally present in them. These are chiefly the phenols of the benzol series, carbolic acid, cresols and xylenols; the higher phenols for example, the phenols of the naphthalene and anthracene series, however, are present in only quite insignificant quantities.

Now it has been found in practice that as regards a preservative and disinfecting action, only slight importance is to be attributed to the phenols of the benzol series which are chiefly present in tar-oils. Above all, their action is of short duration because such phenols volatilize in the air in a short time and are also easily washed away by water. Consequently, the presence of phenols of the benzol series in tar-oils, and particularly in wood-preserving oils, exercises only a momentary action which, owing to the phenols being evaporated and washed away, very quickly disappears, whereupon only the indifferent tar-oil, which in itself has but little antiseptic value, remains behind.

The above mentioned drawbacks have already led to the tar-oils being treated in very various ways in order to enhance their disinfecting properties. For this purpose, tar-oils have been treated with chlorin, they have been mixed with chlorid of zinc and other organic and inorganic metallic salts, such as compounds of copper, lead, arsenic, silver, mercury and other metals, and, lastly, they have been nitrated.

A primary object of my invention is not only to obviate the above mentioned drawbacks, but also to enhance in an effective manner the antiseptic, fungicidal and insecticidal action of tar-oils, both when rich and when poor in phenols, and, particularly to lengthen the duration of their action.

To this end my improved process substantially consists in mixing tar-oils with higher phenols, *i. e.* those of the naphthalene and anthracene series. It is well known that these phenols themselves possess antiseptic properties, but it was doubtful whether these higher phenols dissolved in tar-oils would not evaporate simultaneously with the lower phenols of the benzol series, their vapors being able to serve as a vehicle, as in distillation of water, especially as these higher phenols themselves gradually evaporate in the air. I have found, however, that as soon as the said higher phenols are dissolved in suitable tar-oils, they can be exposed for a long time to the air without volatilizing. Moreover, an enhanced effect is obtained by employing, instead of the above-named phenols themselves, their halogen compounds. For example, I may dissolve 5 kg. naphthol in 100 parts of tar-oil obtained from wood-tar or coal-tar while slightly heating it, the solution being then left to cool.

In order that the phenols of the benzol series which are present may be utilized and not lost, I preferably first abstract by lixiviation with alkalis the phenols naturally contained in the tar-oil, and only then dissolve the higher phenols in the remaining oil free from phenols. In this manner the abstracted low phenols, particularly carbolic acid and cresols, can be turned to practical account in some other way. I have also found that this operation can be carried out in the reverse order, *i. e.* the higher phenols or their derivatives being first dissolved in the tar-oil still containing the phenols of the benzol series and a suitable alkaline lye being added to the solution thus obtained. The lye becomes saturated with carbolic acid and cresols, while the higher phenols remain in the oil. As compared with the previously described process, this process has the advantage that the higher phenols dissolve more readily in oil containing carbolic acid and cresols than in oil from which the lower phenols have been completely abstracted. Finally, I have found that the two processes, i. e. the lixiviation and the solution processes, can be combined in one single process. In this case, for lixiviating the tar-oils containing phenols I employ, instead of the alkali lye, solutions of the higher phenols or their derivatives in alkalis. An exchange of the phenols occurs, the lower phenols passing from the oil into the lye, and the higher phenols from the lye into the oil.

As a specific example: I dissolve 2 parts of β-naphthol in 98 parts of soda-lye (2% strength) and mix this solution intimately with 100 parts of coal tar-oil or wood tar-oil containing carbolic acid or cresols. I let the mixture stand for some time and then separate the watery solution forming the upper layer from the lower oily solution. The watery solution now contains the carbolic acid and the cresols, while the oily layer is enriched in naphthol.

I claim:—

1. A process of improving the antiseptic, fungicidal, and insecticidal action of tar-oils, consisting in dissolving in tar-oil higher phenols of the benzol series having more than 7 carbon-atoms, and in subsequently removing the carbolic acids and the cresols from the treated tar-oil.

2. A process of improving the antiseptic, fungicidal, and insecticidal action of tar-oils, consisting in dissolving in tar-oil phenols of the naphthalene series, and in subsequently removing the carbolic acids and the cresols from the treated tar-oil.

3. A process of improving the antiseptic, fungicidal, and insecticidal action of tar-oils, consisting in treating tar-oil with an alkaline solution of the higher phenols of the benzol series having more than 7 carbon-atoms, and in subsequently removing the alkaline lye containing the carbolic acid and the cresols of the treated tar-oil.

4. A process of improving the antiseptic, fungicidal, and insecticidal action of tar-oils, consisting in treating tar-oil with an alkaline solution of the phenols of the naphthalene series, and in subsequently removing the alkaline lye containing the carbolic acid and the cresols of the treated tar-oil.

In testimony whereof, I affix my signature in the presence of two witnesses.

Dr. HUGO NOERDLINGER.

Witnesses:
 JEAN GRUND,
 CARL GRUND.